United States Patent [19]

Ohno et al.

[11] Patent Number: 5,502,523
[45] Date of Patent: Mar. 26, 1996

[54] INVERTED GALILEAN FINDER FOR CAMERA

[75] Inventors: Kazunori Ohno; Yasuhiko Tanaka, both of Saitama, Japan

[73] Assignee: Fuji Photo Optical Co., Ltd., Saitama, Japan

[21] Appl. No.: 303,154

[22] Filed: Sep. 8, 1994

[30] Foreign Application Priority Data

Sep. 9, 1993 [JP] Japan .................. 5-248743

[51] Int. Cl.⁶ .................................................. G03B 13/02
[52] U.S. Cl. ............................................................. 354/219
[58] Field of Search ............................................. 354/219

[56] References Cited

U.S. PATENT DOCUMENTS

| | | | |
|---|---|---|---|
| 2,487,773 | 11/1949 | Schwartz. | |
| 4,348,090 | 9/1982 | Iizuka | 354/219 |
| 5,214,466 | 5/1993 | Nagano et al. | 354/402 |
| 5,257,055 | 10/1993 | Cho et al. | 354/222 |
| 5,309,201 | 5/1994 | Lyon | 354/219 |

FOREIGN PATENT DOCUMENTS

| | | |
|---|---|---|
| 50-147628 | 12/1975 | Japan. |
| 55-55829 | 4/1980 | Japan. |

Primary Examiner—Michael L. Gellner
Assistant Examiner—Daniel G. Chapik
Attorney, Agent, or Firm—Young & Thompson

[57] ABSTRACT

An inverted Galilean finder incorporated in an automatic focusing camera has an optical system including an objective lens, an eyepiece and a transparent cover plate disposed in front of the objective lens for protecting the finder optical system from foreign particles. The cover plate is formed on its front surface with a framing marking for defining an exposure frame and a target marking which is directed toward an object to be focused when taking a picture and on its back surface with diopter adjustment lenses arranged correspondingly in position to the framing and target markings, respectively.

10 Claims, 2 Drawing Sheets

INVERTED GALILEAN FINDER FOR CAMERA

BACKGROUND OF THE INVENTION

1. Field of the Invention

The resent invention relates to an inverted Galilean finder for a photopraphic camera and, more particularly, to an Albada type of inverted Galilean finder improved in structure.

2. Description of Related Art

Modern compact cameras, widely used for nonprofessional purpose, are typically equipped with various automatic features, such as automatic exposure, automatic focusing, automatic film winding, low luminanee flash exposure, etc. Such an automatic compact camera provides various opportunity of taking pictures with ease for amateur photographers. These automatic compact cameras of the middle class are typically equipped with bright frame finders, such as an illuminating window type bright frame finder whose distinctive feature is a framing line which stands out in bold relief against the field of view. However, because the illuminating window type bright frame finder is necessarily equipped with an illuminating optical system which correlates optically with a finder optical system, it makes the compact camera with various automatic features bulky. For this reason, the automatic compact camera is typically equipped with an Albada type inverted Galilean finder.

For the purpose of providing a brief background of an Albada type finder which will enhance an understanding of the present invention, reference is made to FIG. 1.

Reference to FIG. 1 showing a prior art Albada type finder, the finder optical system is comprised of a bi-convex objective lens 2 and a concave eyepiece 1. Disposed between the objective lens 2 and the concave eyepiece 1 is a concave half mirror 3 with a concave surface directed toward the bi-convex objective lens 2. This half mirror 3 is transmittable a half portion of light over the entire area. A framing line 4 of a metal, such as aluminum, is formed on the surface of the objective lens 2 facing the half mirror 3 by vacuum vapor deposition. If the Albada finder is incorporated in a camera with an automatic focusing feature, a target marking (not shown), in which an object to be focused is positioned, is formed on the surface of the objective lens 2 at a center area of the field of view by vacuum vapor deposition.

However, with the Albada finder of this type having an optical element formed as a half mirror over the entire area, the field of view is lightly colored and/or becomes dimmed. Further, the optical image of the framing line is deteriorated in sharpness and blurred. In addition, the metal deposition of framing line and the use of half mirror increases the cost of optical finder.

SUMMARY OF THE INVENTION

It is an object of the present invention to provide an Albada type inverted Galilean finder with no half mirror provided which improves the brightness of the field of view and the sharpness of a framing line and decreases the cost of manufacture of the finder.

The above object of the present invention is achieved by providing an inverted Galilean finder incorporated in a camera with an automatic focusing feature, whose optical system includes at least an objective lens and an eyepiece. The finder optical system is provided with a transparent cover plate disposed in front of the objective lens for protecting the finder optical system from foreign particles which is formed on its front surface with a framing marking for defining an exposure frame and a target marking which is directed toward an object to be focused when taking a picture. The transparent cover plate is further formed on its back surface with diopter adjustment lenses arranged correspondingly in position to the framing and target markings, respectively. Each diopter adjustment lens has its focal point on the corresponding marking so as to place the markings adjusted to dioptric power of the finder optical system. The framing and target marking may be formed by metal deposition or by silk screen printing, or otherwise provided as scattering surfaces. If printing, it is desired to form black markings or dark color markings.

With the inverted Galilean finder thus structured, when seeing an object through the finder, the markings are properly magnified by the diopter adjusting lenses, so as to stand out in bold relief against the field of view. Since there is no dimming element, such a half mirror, provided in the finder optical system, these marks are bright and sharp, enabling a photographer to perform targeting and framing of an object with ease.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENTS

Figure 1:
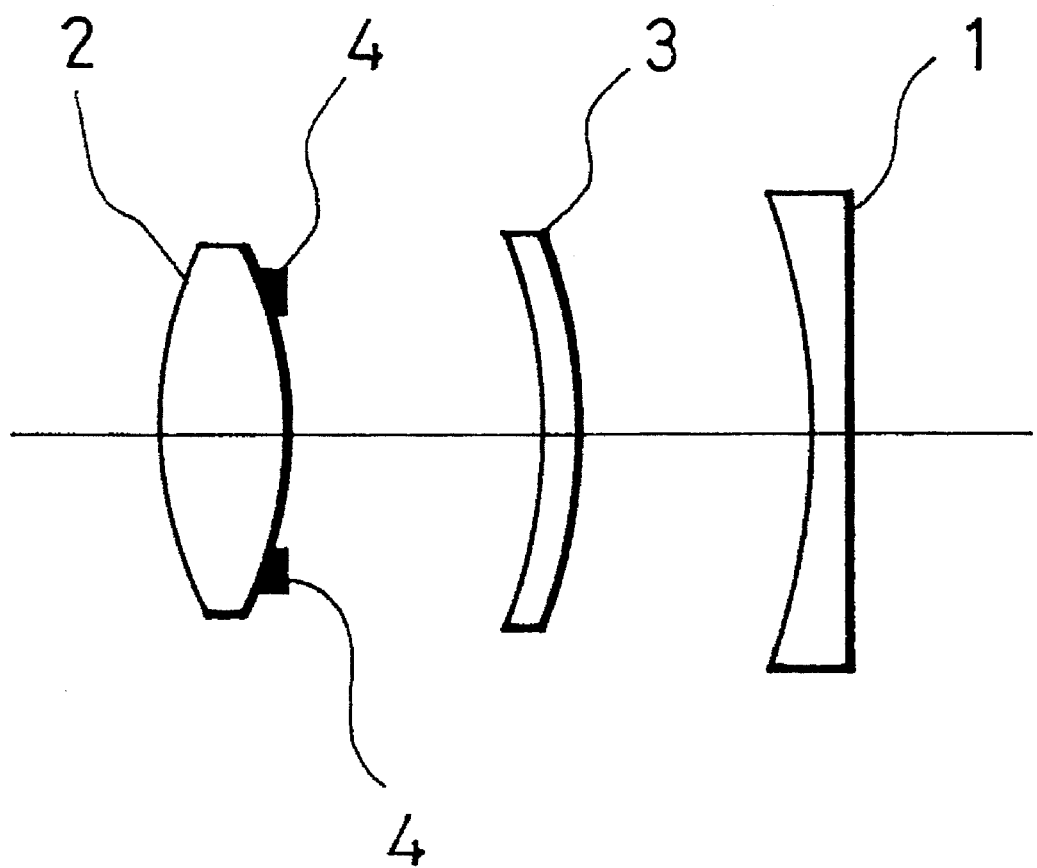
FIG. 1 is a schematic diagrammatic side view of an optical system of a prior art Albada type inverted Galilean finder.
Figure 2:
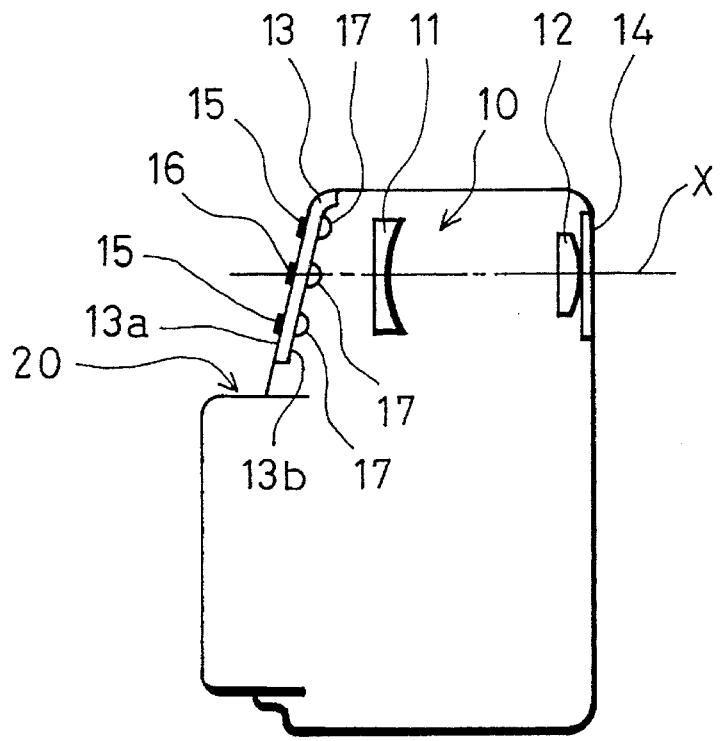
FIG. 2 is a schematic sectional view of a camera with an Albada type inverted Galilean finder in accordance with a preferred embodiment of the present invention.
Figure 3:
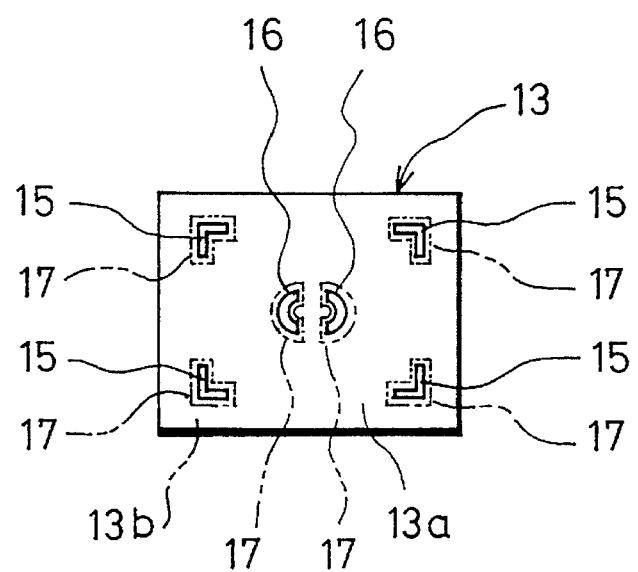
FIG. 3 is a plan view of a front cover plate forming a part of the Albada type inverted Galilean finder of FIG. 1.

Referring now to the drawings and, in particular to FIG. 2 showing an optical system 10 of an Albada type inverted Galilean finder (which is hereafter refereed to as a finder for simplicity) in accordance with a preferred embodiment of the present invention incorporated within a camera 20 only schematically illustrated, the optical system 10 includes a front transparent cover plate 13, a concave objective lens 11, a convex eyepiece 12 and a rear transparent cover plate 14 in order from the object side. All these optical elements are coaxially disposed along with the optical axis X of the finder and stationary with respect one another. The front and rear transparent cover plates 13 and 14 are attached to the camera 20 so as to close openings (not shown) of the finder, thereby preventing foreign particles from entering into the inside of the finder.

Referring to FIG. 2, the front transparent cover plate 13 is formed on its front surface 13a with framing markings 15 in a form of L-shaped bracket which define four corners of a rectangular frame area and target markings 16 in a form of semi-circular arc which define an area for focusing at the center of the rectangular frame area. These markings 15 and 16 are formed in silk screen printing or by metal deposition, or otherwise may be formed as coarse surfaces capable of causing enough scattering. The front transparent cover plate 13 is further formed on its back surface 13b with diopter adjusting elements, such as convex or cylindrical lenses 17 similar in shape to and slightly larger in size than the respective markings 15 and 16, which focus on the markings 15 and 16. Because it is desirable to form these markings 15 and 16 as small as possible, these diopter adjusting lenses 17 are designed and adapted so that properly magnified images of these markings 15 and 16 appear in the view field and adjusted to dioptric power of the finder optical system. These diopter adjusting lenses 17 are cemented to the front transparent cover plate 13 together, or otherwise formed integrally with the front transparent cover plate 13 in any well known manner.

With the inverted Galilean finder of the present invention, when seeing an object through the finder before making an exposure, the markings 15 and 16 are illuminated by ambient light and magnified by the diopter adjusting lenses 17, so as to stand out in bold relief against the field of view. Since the finder is not provided a dimming element, such as a half mirror, in the optical system 10, these markings 15 and 16 are bright and sharp. Accordingly, these markings 15 and 16 enables any photographer to perform targeting and framing of an object with ease.

Whereas the diopter adjusting lenses 17 are embodied as being similar in shape to and slightly larger in size than the respective markings 15 and 16, nevertheless, they may be of any desired shapes as long as they do not appear as eyesores but are sharp and bright in the field of view.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An inverted Galilean finder incorporated in a camera comprising:

an optical system including a objective lens and an eyepiece; and a transparent cover plate disposed in front of said objective lens, said transparent cover plate having a front surface on an object side on which a framing marking indicative of an exposure area in the field of view is formed and a back surface on which a lens for diopter adjustment is formed correspondingly in position to said framing marking.

2. An inverted Galilean finder as defined in claim 1, wherein said framing marking comprises L-shaped bracket markings defining four corners of a rectangular exposure frame.

3. An inverted Galilean finder as defined in claim 1, wherein said framing marking is formed by metal deposition.

4. An inverted Galilean finder as defined in claim 1, wherein said framing marking is formed by silk screen printing.

5. An inverted Galilean finder as defined in claim 1, wherein said framing marking is formed as a scattering surface.

6. An inverted Galilean finder as defined in claim 1, and further comprising a target marking formed on said front surface of said transparent cover plate and a lens for diopter adjustment formed correspondingly in position to said ftarget marking on said back surface of said transparent cover plate.

7. An inverted Galilean finder as defined in claim 6, wherein said target marking comprises a pair of semi-circular arcs.

8. An inverted Galilean finder as defined in claim 6, wherein said target marking is formed by metal deposition.

9. An inverted Galilean finder as defined in claim 6, wherein said target marking is formed by silk screen printing.

10. An inverted Galilean finder as defined in claim 6, wherein said target marking is formed as a scattering surface.

* * * * *